(12) United States Patent
Goettmann et al.

(10) Patent No.: US 9,102,994 B2
(45) Date of Patent: Aug. 11, 2015

(54) PROCESS FOR SEPARATING AT LEAST ONE PLATINOID ELEMENT FROM AN ACIDIC AQUEOUS SOLUTION COMPRISING, BESIDES THIS PLATINOID ELEMENT, ONE OR MORE OTHER CHEMICAL ELEMENTS

(75) Inventors: Frédéric Goettmann, Les Angles (FR); Bernhard Smutek, Colmar (FR); Agnès Grandjean, Saint Marcel de Careiret (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 196 days.

(21) Appl. No.: 13/982,208

(22) PCT Filed: Jan. 30, 2012

(86) PCT No.: PCT/EP2012/051435
§ 371 (c)(1),
(2), (4) Date: Aug. 2, 2013

(87) PCT Pub. No.: WO2012/104246
PCT Pub. Date: Aug. 9, 2012

(65) Prior Publication Data
US 2013/0319178 A1    Dec. 5, 2013

(30) Foreign Application Priority Data
Feb. 3, 2011   (FR) ...................... 11 50871

(51) Int. Cl.
| | |
|---|---|
| *C01G 55/00* | (2006.01) |
| *C22B 3/16* | (2006.01) |
| *C22B 11/00* | (2006.01) |
| *C22B 61/00* | (2006.01) |
| *C22B 3/00* | (2006.01) |
| *C22B 3/26* | (2006.01) |
| *G21C 19/46* | (2006.01) |
| *G21F 9/06* | (2006.01) |
| *G21F 9/12* | (2006.01) |

(52) U.S. Cl.
CPC .............. *C22B 11/04* (2013.01); *C01G 55/001* (2013.01); *C22B 3/0009* (2013.01); *C22B 11/042* (2013.01); *C22B 61/00* (2013.01); *G21C 19/46* (2013.01); *G21F 9/06* (2013.01); *G21F 9/125* (2013.01); *C01P 2006/80* (2013.01); *Y02W 30/54* (2015.05); *Y02W 30/883* (2015.05)

(58) Field of Classification Search
CPC .... C01G 55/001; C22B 3/009; C22B 11/042; C22B 11/04; C22B 61/00; G21F 9/125; G21C 19/46
See application file for complete search history.

(56) References Cited

U.S. PATENT DOCUMENTS

| | | |
|---|---|---|
| 4,162,231 A | 7/1979 | Horwitz et al. |
| 4,290,967 A | 9/1981 | Campbell et al. |

(Continued)

FOREIGN PATENT DOCUMENTS

| | | | | |
|---|---|---|---|---|
| GB | 2065092 A | * | 6/1981 | ............. C01G 55/00 |
| GB | 2113252 A | | 8/1983 | |

*Primary Examiner* — George Wyszomierski
*Assistant Examiner* — Tima M McGuthry Banks
(74) *Attorney, Agent, or Firm* — Hultquist, PLLC; Mary B. Grant

(57) ABSTRACT

The invention relates to a process for recovering at least one platinoid element contained in an acidic aqueous solution comprising chemical elements other than the platinoid element, the process comprising the steps of (a) bringing the acidic aqueous solution into contact with a reducing amount of a reducing agent which is a non-sulphurous and non-glucidic alcoholic compound chosen from cyclic, optionally aromatic, alcohols and aliphatic polyols, which reduces the platinoid element to its 0 oxidation state; and (b) separating the reduced platinoid element from the acidic aqueous solution.

21 Claims, 2 Drawing Sheets

(56) References Cited

U.S. PATENT DOCUMENTS

| | | |
|---|---|---|
| 5,503,812 A | 4/1996 | Kirishima et al. |
| 7,749,299 B2 * | 7/2010 | Vanheusden et al. ........... 75/362 |
| 2003/0099322 A1 * | 5/2003 | Ozawa et al. ................. 376/324 |

* cited by examiner

PROCESS FOR SEPARATING AT LEAST ONE PLATINOID ELEMENT FROM AN ACIDIC AQUEOUS SOLUTION COMPRISING, BESIDES THIS PLATINOID ELEMENT, ONE OR MORE OTHER CHEMICAL ELEMENTS

CROSS-REFERENCE TO RELATED APPLICATIONS

This application is a U.S. national phase under the provisions of 35 U.S.C. §371 of International Patent Application No. PCT/EP12/51435 filed Jan. 30, 2012, which in turn claims priority of French Patent Application No. 11 50871 filed Feb. 3, 2011. The disclosures of such international patent application and French priority patent application are hereby incorporated herein by reference in their respective entireties, for all purposes.

TECHNICAL FIELD

The present invention relates to a process for separating at least one platinoid element from an acidic aqueous solution comprising, besides this platinoid element, one or more other chemical elements.

Hereinabove and hereafter, it is pointed out that "platinoid element" is taken to mean an element that may be chosen from platinum, palladium, rhodium, ruthenium, iridium, osmium.

The invention is likely to find application in the field of the treatment and the recycling of irradiated nuclear fuels where it has a quite particular interest for recovering in a selective manner a platinoid element from aqueous solutions of high activity such as, for example, raffinates from the treatment of irradiated nuclear fuels.

PRIOR ART

The processes that make it possible to extract and to purify uranium and plutonium present in the dissolution liquors of irradiated nuclear fuels generate effluents, which are given the name of raffinates.

Raffinates are aqueous solutions with high nitric acidity, typically from 2 to 5 M, which contain two minor actinides, namely americium and curium, lanthanides such as lanthanum, cerium, praseodymium, neodymium, samarium and europium, fission products other than lanthanides such as molybdenum, zirconium, rubidium, ruthenium, rhodium, palladium and yttrium, as well as corrosion products such as iron and chromium.

The management thereof presently consists in concentrating them as much as possible then conditioning them in vitreous matrices with a view to storage before ultimate disposal.

Nevertheless, the presence of platinoid elements (such as palladium, rhodium and ruthenium) generates, at the level of vitrification, among others, the following difficulties:
  they exhibit limited solubility in the containment glasses;
  they tend to form particles that precipitate in the vitrification crucibles and, as a result, considerably perturb the functioning of the vitrification processes.

It is to overcome these difficulties and also with a view to recycling the platinoid elements (with regard, in particular, to the predictable rarefaction of the natural resources of these elements) that certain authors have put in place processes for recovering these elements from a solution containing them in addition also to other radioactive elements.

Different separation techniques have been implemented, among which may be cited:
  electrochemical reduction techniques in nitric acid medium, so as to deposit on an electrode the platinoid elements, which it is wished to separate, as described in US 2003/0099322, with, nevertheless, as drawback, a relatively complex implementation;
  liquid-liquid extraction techniques involving the use of extraction agents, such as tricaprylmethylammonium nitrate (as described in U.S. Pat. No. 4,162,231) or dialkyl sulphide (as described in U.S. Pat. No. 5,503, 812), these techniques nevertheless have the drawback of generating an important amount of secondary effluents;
  precipitation techniques by chemical reduction of platinoid elements in nitric acid medium involving the use of a chemical reducing agent, such as saccharose as in U.S. Pat. No. 4,290,967, this embodiment bringing about problems of denitration reaction, which reaction has a highly exothermic character which could be the source of self-ignition of the nitric acid medium.

With a view to overcoming the drawbacks inherent in the techniques implemented in the prior art, the authors of the present invention have proposed developing a novel method for recovering one or more platinoid elements contained in an acidic aqueous solution, for example, an aqueous nitric solution, comprising other chemical elements, such as radioactive elements.

They have thus discovered, in a surprising manner, that by using certain organic alcohols, it is possible to extract selectively the platinoid elements contained in an acidic aqueous solution, by a simple and cheap implementation, without this generating large amounts of secondary effluents and without this resulting in the drawbacks linked to important denitration reactions, when the acidic aqueous solution is an aqueous nitric solution.

DESCRIPTION OF THE INVENTION

The invention thus relates to a method for recovering at least one platinoid element contained in an acidic aqueous solution comprising chemical elements other than said platinoid element, said process comprising the following steps:
  a step of bringing said acidic aqueous solution into contact with a reducing amount of a reducing agent which is a non-sulphurous and non-glucidic alcoholic compound chosen from cyclic, optionally aromatic, alcohols and aliphatic polyols, by means of which said platinoid element is reduced to its 0 oxidation state;
  a step of separating said thus reduced platinoid element from said acidic aqueous solution.

Before going into more detail in the description of the invention, the following definitions will be defined.

Hereinabove and hereafter, platinoid element is taken to mean a metal element existing in an oxidation state different to 0, which metal element is chosen from platinum, palladium, rhodium, ruthenium, iridium, osmium.

Thanks to the choice of specific alcohols used in specific amounts (namely, amounts enabling reduction to its 0 oxidation state of the platinoid element(s) present in the acidic aqueous solution), it is possible to obtain a selective reduction of the platinoid element(s) compared to other chemical elements present in the acidic aqueous solution, without there being pollution from said solution by sulphur (due to the fact that the alcohols are non-sulphurous), which would be totally unacceptable for the vitrification of the solution thereby obtained after extraction of said platinoid elements.

As mentioned above, the non-sulphurous and non-glucidic alcoholics that can be used for the process of the invention may be cyclic, optionally aromatic, alcohols i.e. in other words:

cyclic, optionally aromatic, hydrocarbon compounds comprising at least one ring directly bearing at least one hydroxyl group; or cyclic, optionally aromatic, hydrocarbon compounds, the ring of which bears at least one, linear or branched, saturated or unsaturated hydrocarbon group, which hydrocarbon group bears at least one hydroxyl group.

Concerning cyclic hydrocarbon compounds, comprising at least one ring directly bearing at least one hydroxyl group, alicyclic and monocyclic compounds comprising from 4 to 10 carbon atoms, bearing at least one hydroxyl group may be cited. By way of example of compounds complying with this definition, cyclohexanol may be cited.

Concerning cyclic, optionally aromatic, hydrocarbon compounds, the ring of which bears at least one, linear or branched, saturated or unsaturated hydrocarbon group bearing at least one hydroxyl group, monocyclic aromatic compounds may be cited, the ring of which bears at least one, linear or branched, hydrocarbon group bearing at least one hydroxyl group and the ring of which also optionally bears one or more groups other than the aforementioned hydrocarbon group, such as alkoxy, —OH groups.

More precisely, it may be phenylic compounds, the phenyl group of which bears at least one, linear or branched, saturated or unsaturated hydrocarbon group, being able to comprise from 4 to 10 carbon atoms, which hydrocarbon group bears at least one hydroxyl group, which phenyl group may also bear one or more groups other than the aforementioned hydrocarbon group.

According to a first variant, specific compounds complying with the definition given above may be phenylic compounds, the phenyl group of which bears a linear or branched, saturated hydrocarbon group comprising from 1 to 4 carbon atoms, which hydrocarbon group bears a hydroxyl group.

More precisely, specific compounds complying with this definition may be phenylic compounds, the phenyl group of which bears a —CH$_2$—OH group and optionally at least one group chosen from alkoxy or —OH groups.

When the compound consists of a phenyl group, only bearing a —CH$_2$OH group, it corresponds to the benzylic alcohol of following formula:

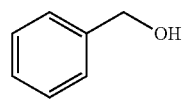

Other specific compounds complying with this definition may be phenylic compounds, the phenyl group of which bears a —CH(OH)—CH$_3$ group and optionally at least one group chosen from alkoxy or —OH groups.

When the compound consists of a phenyl group, only bearing a —CH(OH)—CH$_3$ group, it corresponds to the alcohol of following formula:

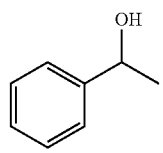

commonly designated under the terminology of 1-phenyl-1-ethanol.

When the compound consists of a phenyl group, bearer of a —CH$_2$OH group and at least one group other than a —CH$_2$OH group, it may correspond to a benzylic alcohol derivative of following formula:

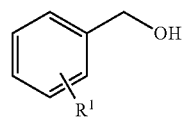

in which R$^1$ is an alkoxy group or a hydroxyl group.

R$^1$ may be situated in ortho, meta or para position with respect to the —CH$_2$—OH group.

Advantageously, R$_1$ is situated in para position with respect to the —CH$_2$—OH group, in which case the compound meets the following formula:

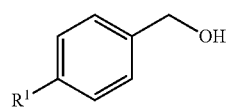

R$^1$ being as defined above.

Specific compounds meeting the definition given above may be 4-methoxybenzylic alcohol or 4-hydroxybenzylic alcohol, which correspond respectively to the following formulas:

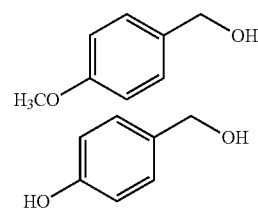

According to a second variant, specific compounds meeting the definition given above (namely, compounds belonging to the family of phenylic compounds, the phenyl group of which bears at least one, linear or branched, saturated or unsaturated hydrocarbon group, being able to comprise from 1 to 4 carbon atoms, which group bears at least one hydroxyl group) may be phenylic compounds, the phenyl group of which bears at least one, linear or branched, unsaturated hydrocarbon group being able to comprise from 2 to 4 carbon atoms, which hydrocarbon group bears at least one hydroxyl group.

More precisely, specific compounds complying with this definition may be phenylic compounds, the phenyl group of which bears a linear or branched, monounsaturated hydrocarbon group, being able to comprise from 2 to 4 carbon atoms, such as a —CH═CH—CH$_2$—OH group, a specific example of such compounds being the cinnamyl alcohol of following formula:

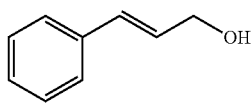

As mentioned above, the non-sulphurous and non-glucidic alcohols that may be used for the process of the invention may be aliphatic polyols, namely linear or branched hydrocarbon compounds, comprising at least two hydroxyl groups. These compounds may comprise from 2 to 4 carbon atoms.

Advantageously, these compounds may be ethylene glycol or glycerine of following respective formulas:

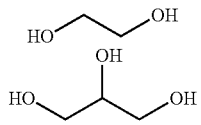

In particular, the platinoid element according to the invention may be palladium.

The reducing amount of reducing agent needed to reduce the platinoid element(s) to their 0 oxidation state may be chosen, by those skilled in the art, by simple experimental tests (the reduction to the oxidation state being able to be materialised visually by a precipitation of the platinoid element(s)).

According to the invention, the acidic aqueous solution may be a nitric solution (i.e. in other words an aqueous solution of nitric acid).

In this instance, the use of specific alcohols as defined above contributes to avoiding, in addition, highly exothermic denitration reactions of the nitric solution, which are conventionally caused by the presence in a nitric solution of reducing glucides (such as saccharose).

According to the invention, the nitric solution intended to be treated according to the process of the invention may be a raffinate (or aqueous solution) from processes of treating irradiated nuclear fuels, which process conventionally comprises:
  a step of dissolution of a spent fuel in a highly concentrated aqueous solution of nitric acid, by means of which an aqueous nitric solution is obtained comprising uranium, plutonium, fission products (such as lanthanides, yttrium elements, one or more platinoid elements), minor actinides (such as americium and curium), corrosion products;
  a step of co-extraction of uranium and plutonium from said aqueous solution by means of an extracting organic phase, at the end of which there remains an organic phase comprising uranium and plutonium and an aqueous phase corresponding to the aforementioned raffinate comprising, apart from the aforementioned platinoid element(s) (such as palladium, ruthenium, rhodium), two minor actinides, namely americium and curium, lanthanides such as lanthanum, cerium, praseodymium, neodymium, samarium and europium, fission products other than lanthanides and platinoids such as molybdenum, zirconium, rubidium and yttrium, as well as corrosion products such as iron and chromium.

The aqueous solution of nitric acid may be an aqueous solution with strong nitric acidity, typically from 2 to 5 M.

Once the step of adding a reducing agent has been implemented, the process of the invention comprises a step of separating said thus reduced platinoid element from said acidic aqueous solution, this step being able to be carried out, for example, by a simple filtration, a decantation operation or a centrifugation operation.

The solution thereby obtained rid of all or part of the platinoid elements may then be used with a view to being vitrified by a conventional vitrification process.

The invention will now be described with respect to the following examples given by way of illustration and non-limiting.

DETAILED DESCRIPTION OF PARTICULAR EMBODIMENTS

Example 1

The aim of the present example is the study of palladium/cerium separation in nitric solution implementing the use of benzylic alcohol.

In this example, palladium chloride ((NH$_4$)$_2$PdCl$_4$) and cerium nitrate (Ce(NO$_3$)$_3$) are used, palladium being a platinoid element and cerium being one of the fission products present in the raffinates and considered as representative of all the lanthanides.

For each of the tests of this example, 10 mL of 1 mol/L nitric acid solution are used, to which is added 71 mg of palladium chloride and 87 mg of cerium nitrate i.e. 0.2 mmol of palladium and 0.2 mmol of cerium. After addition of the desired amount of benzylic alcohol, the solutions are placed in Parr digestion bombs and heated to a desired temperature for 16 hours.

Different series of tests are carried out with variable amounts of benzylic alcohol at a given temperature:
  a series of tests at 150° C. with respective benzylic alcohol amounts of 0; 0.35; 0.4; 0.5 and 0.7 g;
  a series of tests at 180° C. with respective benzylic alcohol amounts of 0; 0.35; 0.4; 0.5 and 0.7 g.

Figure 1:
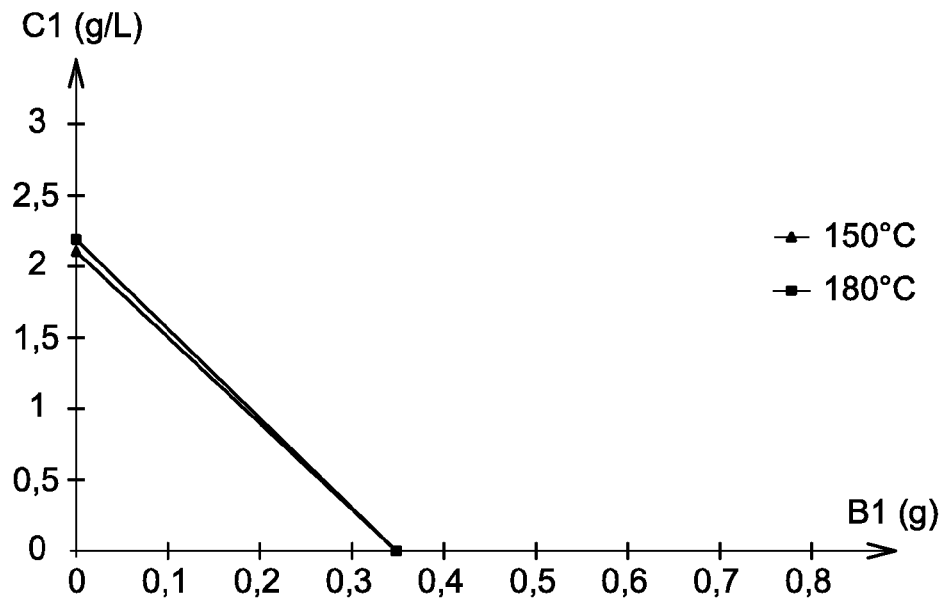
FIG. 1 illustrates the evolution of the amount of palladium C1 (in g/L) as a function of the added amount of benzylic alcohol B1 (in g) after 16 hours of reaction, within the scope of example 1 below.
Figure 2:
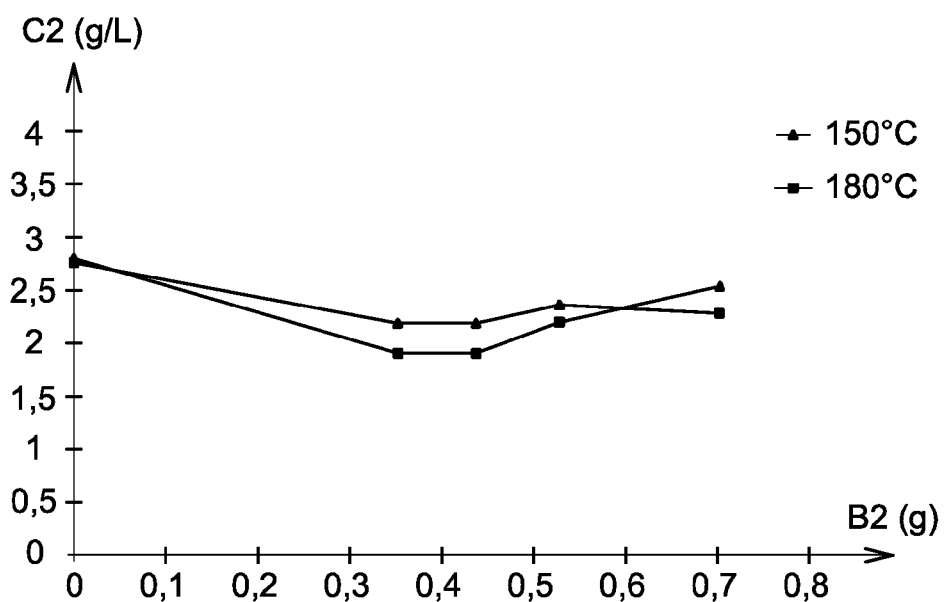
FIG. 2 illustrates the evolution of the amount of cerium C2 (in g/L) as a function of the added amount of alcohol B2 (in g) after 16 hours of reaction, within the scope of example 1 below.

For each of these series, the measurement was carried out (by ICP-AES) respectively of the amount of palladium and of the amount of cerium after 16 hours of reaction, the results of these measurements being reported respectively in the following figures:
  FIG. 1 illustrating the evolution of the amount of palladium C1 (in g/L) as a function of the added amount of benzylic alcohol B1 (in g) after 16 hours of reaction;
  FIG. 2 illustrating the evolution of the amount of cerium C2 (in g/L) as a function of the added amount of benzylic alcohol B2 (in g) after 16 hours of reaction.

As may be noted in these figures, a temperature of 180° C. makes it possible to precipitate all the palladium for amounts of benzylic alcohol from 0.3 g and also a non-negligible amount of cerium, whereas a temperature of 150° C. makes it possible to precipitate all the palladium from benzylic alcohol from 0.3 g while enabling a precipitation of cerium in lesser amounts than at 180° C.

It has also been noted that the palladium precipitates in the form of particles of a hundred or so nanometers diameter within an organic matrix constituted of an aromatic polymer from the polycondensation of the benzylic alcohol and the oxidation products thereof. The formation of this matrix largely facilitates the separation between the solution containing cerium and palladium having precipitated. Furthermore, no substantial extra pressure is observed in the reactor at the end of reaction, which attests to the absence of denitration or, at the least, to a very limited denitration phenomenon, which proves the safety aspect of the process of the invention.

Example 2

Figure 3:
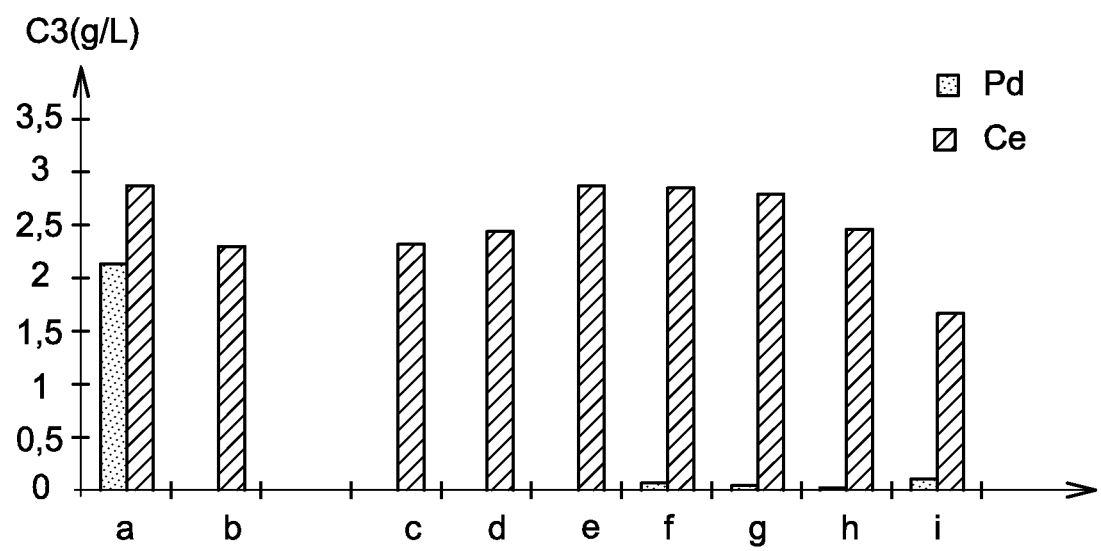
FIG. 3 illustrates the concentration of metal ions (palladium and cerium) remaining in solution C3 (in g/L) after heating to 150° C. for 16 hours for the different alcohols tested in example 2.

The aim of the present example is the study of palladium/cerium separation in nitric solution implementing the use of different alcohols: benzylic alcohol (part b of FIG. 3), 4-methoxybenzylic alcohol (part c of FIG. 3), glycerine (part d of FIG. 3), 1-phenyl-1-ethanol (part e of FIG. 3), ethylene glycol (part f of FIG. 3), cinnamyl alcohol (part g of FIG. 3), 4-hydroxybenzylic alcohol (part h of FIG. 3) and cyclohexanol (part i of FIG. 3). A test was carried out without alcohol (part a of FIG. 3).

In this example, palladium chloride (($NH_4$)$_2$PdCl$_4$) and cerium nitrate (Ce($NO_3$)$_3$) are used, palladium being a platinoid element and cerium being one of the fission products present in the raffinates and considered as representative of all the lanthanides.

For each of the tests of this example, 10 mL of a 1 mol/L nitric acid solution is used, to which is added 71 mg of palladium chloride and 87 mg of cerium nitrate i.e. 0.2 mmol of palladium and 0.2 mmol of cerium. After addition of the desired amount of alcohol (here, 4.8 mmol), the solutions are placed in Parr digestion bombs and heated to a temperature of 150° C. for 16 hours.

FIG. 3 illustrates the concentration of metal ions (palladium and cerium) remaining in solution (in g/L) after heating to 150° C. for 16 hours for the aforementioned different alcohols tested.

As may be seen from this figure, all of the alcohols tested have a good selectivity vis-à-vis palladium.

Example 3

In order to get as close as possible to a system encountered in the treatment of aqueous effluents from the reprocessing of spent fuels, selective precipitation tests of palladium were carried out on a model solution of nitric acid (1.5 M) corresponding to the composition described in the table below and a total nitrates load of 3.5 mol/L.

| Oxide used | Oxide concentration (g/L) | Metal element | Concentration of metal element (g/L) |
|---|---|---|---|
| Na$_2$O | 18.739 | Na | 13.90 |
| Al$_2$O$_3$ | 7.378 | Al | 3.90 |
| ZnO | 0.209 | Zn | 0.17 |
| ZrO$_2$ | 9.479 | Zr | 7.02 |
| TeO$_2$ | 1.272 | Te | 1.02 |

-continued

| Oxide used | Oxide concentration (g/L) | Metal element | Concentration of metal element (g/L) |
|---|---|---|---|
| Cs$_2$O | 5.757 | Cs | 5.43 |
| SrO | 1.703 | Sr | 1.44 |
| BaO | 3.632 | Ba | 3.25 |
| SnO$_2$ | 0.128 | Sn | 0.10 |
| Cr$_2$O$_3$ | 0.222 | Cr | 0.15 |
| Fe$_2$O$_3$ | 1.698 | Fe | 1.19 |
| MnO$_2$ | 1.997 | Mn | 1.26 |
| La$_2$O$_3$ | 6.444 | La | 5.49 |
| Nd$_2$O$_3$ | 14.878 | Nd | 12.75 |
| Ce$_2$O$_3$ | 5.195 | Ce | 4.44 |
| Pr$_2$O$_3$ | 2.821 | Pr | 2.41 |
| MoO$_3$ | 9.413 | Mo | 6.27 |
| P$_2$O$_5$ | 0.925 | P | 0.40 |
| — | — | Pd | 2.98 |
| Total | 91.89 | | 70.61 |

To carry out the tests, 10 mL of the solution were used. After addition of 500 mg of benzylic alcohol, the solution was placed in a Parr digestion bomb and heated to 150° C. for 16 hours. This manipulation was repeated 4 times to offset any experimental errors.

The amounts of palladium and cerium present in the solution at the end of the test were measured by ICP-AES (in other words by atomic emission spectroscopy). The average results calculated on the basis of 4 tests are as follows:

Palladium 0.05 g/L

Cerium 4.09 g/L

As may be seen from these results, the palladium has been almost totally eliminated, whereas the cerium remains very largely in solution.

The invention claimed is:

1. A process for recovering at least one platinoid element contained in an acidic aqueous solution comprising chemical elements other than said platinoid element, said process comprising the following steps:

bringing said acidic aqueous solution into contact with a reducing amount of a reducing agent which is a non-sulphurous and non-glucidic alcoholic compound chosen from monocyclic aromatic compounds, the ring of which bears at least one, linear or branched, saturated or unsaturated hydrocarbon group, bearing at least one hydroxyl group and the ring of which also optionally bears one or more groups other than the hydrocarbon group, which reducing agent reduces said platinoid element to its 0 oxidation state; and separating the reduced platinoid element from said acidic aqueous solution.

2. Process according to claim 1, wherein said compounds are phenylic compounds, the phenyl group of which bears at least one, linear or branched, saturated or unsaturated hydrocarbon group comprising from 1 to 4 carbon atoms, which hydrocarbon group bears at least one hydroxyl group, which phenyl group may also bear one or more groups other than the hydrocarbon group.

3. Process according to claim 2, wherein said compounds are phenylic compounds, the phenyl group of which bears a —CH$_2$—OH group and optionally at least one group chosen from alkoxy or —OH groups.

4. Process according to claim 3, wherein such a compound corresponds to the benzylic alcohol of following formula:

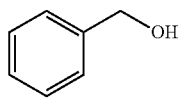

5. Process according to claim 3, wherein such a compound corresponds to a benzylic alcohol derivative of following formula:

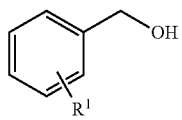

in which $R^1$ is an alkoxy group or a hydroxyl group.

6. Process according to claim 5, wherein $R^1$ is situated in ortho, meta or para position with respect to the —CH$_2$—OH group.

7. Process according to claim 5, wherein $R_1$ is situated in para position with respect to the —CH$_2$—OH group, in which case the compound meets the following formula:

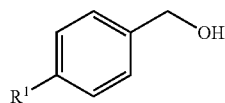

$R^1$ being an alkoxy group or a hydroxyl group.

8. Process according to claim 7, wherein such a compound is chosen from 4-methoxybenzylic alcohol or 4-hydroxybenzylic alcohol, which correspond respectively to the following formulas:

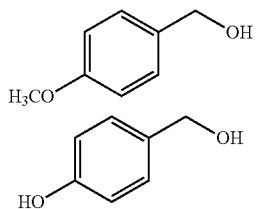

9. Process according to claim 2, wherein said compounds are phenylic compounds, the phenyl group of which bears a —CH(OH)—CH$_3$ group and optionally at least one group chosen from alkoxy or —OH groups.

10. Process according to claim 9, wherein such a compound corresponds to a compound of following formula:

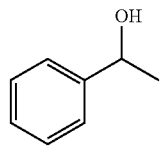

11. Process according to claim 2, wherein such compounds are phenylic compounds, the phenyl group of which bears at least one, linear or branched, unsaturated hydrocarbon group comprising from 2 to 4 carbon atoms.

12. Process according to claim 11, wherein such compounds are phenylic compounds, the phenyl group of which bears a —CH=CH—CH$_2$—OH group.

13. Process according to claim 12, wherein such a compound is the cinnamyl alcohol of following formula:

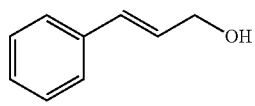

14. Process according to claim 1, wherein the platinoid element is palladium.

15. Process according to claim 1, wherein the acidic aqueous solution is a nitric solution.

16. Process according to claim 15, wherein the nitric solution is a raffinate from processes of treating irradiated nuclear fuels.

17. Process according to claim 1, wherein the group other than the hydrocarbon group is an alkoxy or —OH group.

18. A process for recovering at least one platinoid element contained in an acidic aqueous solution comprising chemical elements other than said platinoid element, said process comprising the following steps:
bringing said acidic aqueous solution into contact with a reducing amount of a reducing agent which is cyclohexanol, reducing said platinoid element to its 0 oxidation state; and
separating the reduced platinoid element from said acidic aqueous solution.

19. Process according to claim 18, wherein the platinoid element is palladium.

20. Process according to claim 18, wherein the acidic aqueous solution is a nitric solution.

21. Process according to claim 20, wherein the nitric solution is a raffinate from processes of treating irradiated nuclear fuels.

* * * * *